United States Patent
Furusawa et al.

(10) Patent No.: US 10,871,199 B2
(45) Date of Patent: Dec. 22, 2020

(54) VIBRATION ISOLATOR

(71) Applicant: Toyo Tire Corporation, Itami (JP)

(72) Inventors: Norimitsu Furusawa, Itami (JP); Hideaki Shimazu, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 16/281,419

(22) Filed: Feb. 21, 2019

(65) Prior Publication Data

US 2019/0301555 A1 Oct. 3, 2019

(30) Foreign Application Priority Data

Apr. 3, 2018 (JP) ................................. 2018-071749

(51) Int. Cl.
| | | |
|---|---|---|
| *F16F 13/00* | (2006.01) | |
| *F16F 13/10* | (2006.01) | |
| *B60K 5/12* | (2006.01) | |
| *F16F 13/08* | (2006.01) | |

(52) U.S. Cl.
CPC ............. *F16F 13/103* (2013.01); *B60K 5/12* (2013.01); *B60K 5/1208* (2013.01); *F16F 13/08* (2013.01); *F16F 13/108* (2013.01); *F16F 13/10* (2013.01); *F16F 2226/045* (2013.01); *F16F 2230/02* (2013.01)

(58) Field of Classification Search
CPC ........ B60K 5/1208; F16F 13/08; F16F 13/10; F16F 13/108; F16F 13/085; F16F 13/103
See application file for complete search history.

(56) References Cited

U.S. PATENT DOCUMENTS

2012/0267184 A1 10/2012 Joly et al.

FOREIGN PATENT DOCUMENTS

| CN | 106838115 A | 6/2017 | |
|---|---|---|---|
| DE | 102016012732 A1 * | 5/2017 | ........... B60K 5/1208 |
| EP | 1 321 692 A2 | 6/2003 | |
| JP | 2009-196512 A | 9/2009 | |

OTHER PUBLICATIONS

Machine translation of DE 10 2016 012 732 (no date).*
Machine translation of EP 1321692 (no date).*
Extended European Search Report dated Aug. 22, 2019, issued in counterpart EP application No. 19160436.2. (75 pages).
Office Action dated Jul. 6, 2020, issued in counterpart JP application No. 201910110350.6, with English translation. (8 pages).

* cited by examiner

*Primary Examiner* — Nicholas J Lane
(74) *Attorney, Agent, or Firm* — Westerman, Hattori, Daniels & Adrian, LLP (57) ABSTRACT

Any one of a bracket and a first attachment tool includes a press-fit portion. Another one of the bracket and the first attachment tool includes a tubular press-fitted portion. The press-fit portion is press-fitted to the press-fitted portion. The press-fitted portion includes a tubular rigid portion having an inner surface with recesses depressed and an elastic film portion made of an elastic body bonded to an inner surface of the rigid portion. The press-fit portion includes: a first protrusion portion projecting in a direction perpendicular to the press fitting direction, the first protrusion portion biting into the elastic film portion; and a second protrusion portion that partially overlaps with the rigid portion as viewed in the press fitting direction with the second protrusion portion located inside the recess.

5 Claims, 8 Drawing Sheets

VIBRATION ISOLATOR

TECHNICAL FIELD

The present invention relates to a vibration isolator and especially relates to the vibration isolator configured such that a press-fit portion can be less likely to come off from a press-fitted portion.

BACKGROUND ART

There has been known a vibration isolator that couples a first attachment tool and a second attachment tool together with a vibration-isolation base made of an elastic body and fixes the first attachment tool to a bracket mounted to a support body side or a vibration source side. There is a vibration isolator that includes a first attachment tool including a press-fitted portion in which an elastic body is bonded on an inner surface of a tubular metal fitting for, for example, a reduction in the number of components and a simplification of the structure. Press-fitting a press-fit portion projecting out from a bracket to the press-fitted portion fixes the first attachment tool to the bracket (Patent Literature 1).

CITATION LIST

Patent Literature

[Patent Literature 1] JP-A No. 2009-196512

SUMMARY OF INVENTION

Technical Problem

However, the above-described conventional technique has the following problem. An input of a large load to the vibration isolator and deterioration of the elastic body between the metal fitting and the bracket relatively move the press-fitted portion and the press-fit portion and the press-fit portion is likely to come off from the press-fitted portion.

The present invention has been made to solve the above-described problem and an object of the present invention is to provide a vibration isolator configured such that a press-fit portion is less likely to come off from a press-fitted portion.

Solution to Problem

A vibration isolator of the present invention to achieve this object includes a bracket, a first attachment tool, a second attachment tool, and a vibration-isolation base. The bracket is mounted to any one of a support body side and a vibration source side. The first attachment tool is mounted to the bracket. The second attachment tool is mounted to another one of the support body side and the vibration source side. The vibration-isolation base is made of an elastic body. The vibration-isolation base couples the first attachment tool and the second attachment tool together. Any one of the bracket and the first attachment tool includes a press-fit portion. The press-fit portion has a rigidity higher than a rigidity of the elastic body. The press-fit portion projects out from a rear end toward a distal end in a press fitting direction. Another one of the bracket and the first attachment tool includes a tubular press-fitted portion. The press-fit portion is press-fitted to the press-fitted portion in the press fitting direction. The press-fitted portion includes: a tubular rigid portion having an inner surface with recesses depressed with respect to both front and rear sides in the press fitting direction, the rigid portion having at least one end with an open end portion, the rigid portion having a rigidity higher than a rigidity of the elastic body; and an elastic film portion made of an elastic body bonded to an inner surface of the rigid portion. The press-fit portion includes: a first protrusion portion projecting in a direction perpendicular to the press fitting direction, the first protrusion portion biting into the elastic film portion; and a second protrusion portion that partially overlaps with the rigid portion as viewed in the press fitting direction with the second protrusion portion located inside the recess.

Advantageous Effects of Invention

With the vibration isolator according to a first aspect, by the first protrusion portion biting into the elastic film portion, the press-fit portion can be less likely to come off from the press-fitted portion.

Furthermore, when the second protrusion portion is located in the recess on the rigid portion, the rigid portion having the rigidity higher than that of the elastic body mutually overlaps with a part of the second protrusion portion as viewed in the press fitting direction. Accordingly, even when the elastic film portion made of the elastic body is deteriorated and a large load is input, the press-fit portion can be less likely to come off from the press-fitted portion.

Additionally, even when a tolerance occurs in the recesses and the second protrusion portion, the biting of the first protrusion portion into the elastic film portion can reduce a relative movement of the press-fit portion and the press-fitted portion by the amount of tolerance due to the load input. Consequently, the press-fit portion can be less likely to come off from the press-fitted portion with the first protrusion portion and the second protrusion portion.

With the vibration isolator according to a second aspect, the elastic film portion covers the recesses. Therefore, when the second protrusion portion is located inside the recess, the elastic film portion is compressively deformed between peripheral edge of the recess and the second protrusion portion. This ensures causing the press-fit portion and the press-fitted portion to be less likely to relatively move by an elastic reaction force from the elastic film portion.

Here, in the case where the recesses have bottoms, the second protrusion portion presses the bottom of the recess via the elastic film portion and the rigid portion possibly deforms. This fails to maintain the overlap of the second protrusion portion with the rigid portion in association with the deformation of the rigid portion. Therefore, the press-fit portion is possibly likely to come off from the press-fitted portion. However, since the recesses are formed penetrating the rigid portion, this ensures preventing the deformation of the rigid portion caused by pressing the bottom of the recess by the second protrusion portion. This allows reducing the deformation of the rigid portion and the ease of coming off of the press-fit portion from the press-fitted portion in addition to the effects of the first aspect.

With the vibration isolator according to a third aspect, a compression ratio of the elastic film portion between at least a part of the first protrusion portions and the rigid portion in a compressed state where the press-fit portion has been press-fitted to the press-fitted portion is configured larger than a compression ratio of the elastic film portion between the first protrusion portion and the rigid portion at an early stage in the press-fitting where press-fit portion is press-fitted to the press-fitted portion. Accordingly, at the early stage in the press-fitting, the load in the press fitting direction applied from the first protrusion portion to the elastic film portion can be decreased; therefore, the elastic film portion can be less likely to peel off from the rigid portion. In the press fitting state, since the compression ratio of the elastic film portion between the first protrusion portion and the rigid portion is large, the large elastic reaction force of the elastic film portion at the part can cause the press-fit portion to be less likely to come off from the press-fitted portion further. Accordingly, in addition to the effects of the first aspect, the elastic film portion can be less likely to peel off from the rigid portion and the press-fit portion can be less likely to come off from the press-fitted portion further.

With the vibration isolator according to a fourth aspect, a plurality of the first protrusion portions are located separated in the press fitting direction. A height of the first protrusion portion on the rear end side is configured larger than a height of the first protrusion portion on the distal end side. In the press-fitting that press-fits the press-fit portion to the press-fitted portion, the elastic reaction force applied from the elastic film portion to the first protrusion portion on the distal end side is configured smaller than the elastic reaction force applied from the elastic film portion to the first protrusion portion on the rear end side in a state where the first protrusion portion on the rear end side contacts the elastic film portion. Accordingly, while the load in the press fitting direction applied from the first protrusion portion on the distal end side where the distance of sliding with the inner surface of the elastic film portion is long to the elastic film portion in the press-fitting is decreased, the distance of sliding of the first protrusion portion on the rear end side where the load in the press fitting direction applied to the elastic film portion is large with the elastic film portion can be shortened. Therefore, the elastic film portion can be less likely to be shaved by the first protrusion portion on the distal end side in the press-fitting. Additionally, even when the elastic film portion is likely to be shaved by the first protrusion portion on the rear end side, a distance shaved by first protrusion portion on the rear end side can be shortened. This ensures reducing the shaving of the elastic film portion and the decrease in elastic reaction force from the elastic film portion, and also ensures causing the press-fit portion to be less likely to come off from the press-fitted portion further, in addition to the effects of the third aspect.

With the vibration isolator according to a fifth aspect, the second protrusion portion is located on the rear end side with respect to the first protrusion portion. The recesses are disposed on the rigid portion close to the open end portion. Therefore, a distance that the second protrusion portion slides with the inner surface of the press-fitted portion can be shortened. Accordingly, a distance of a load in the press fitting direction applied from the second protrusion portion to the elastic film portion in the press-fitting can be shortened. Accordingly, the elastic film portion can be less likely to peel off from the rigid portion.

Furthermore, since a part of the second protrusion portions overlaps with the rigid portion when located in the recesses as viewed in the press fitting direction, the press-fit portion is press-fitted to the press-fitted portion while the rigid portion is deformed with the second protrusion portions in the press-fitting. By the positions of the second protrusion portions and the recesses, the length of the part of the rigid portion deformed in the press-fitting can be shortened. This ensures reducing the plastic deformation of the rigid portion and reducing the second protrusion portion being less likely to overlap with the rigid portion. Accordingly, the elastic film portion can be less likely to peel off from the rigid portion. Additionally, this ensures reducing the plastic deformation of the rigid portion and reducing the press-fit portion being likely to come off from the press-fitted portion, in addition to the effects of the first aspect.

With the vibration isolator according to a sixth aspect, the rigid portion includes the respective open end portions on both front and and rear ends in the press fitting direction. The rigid portion has the recesses close to the respective open end portions on both front and rear ends of the rigid portion. Therefore, the press-fit portion can be press-fitted from both of the open end portions on both front and rear ends to the press-fitted portion and the second protrusion portion can be located inside the recesses. This eliminates the need for confirming the direction of the press-fitted portion to which the press-fit portion is press-fitted, thereby ensuring improving the press-fit working efficiency in addition to the effects of the fifth aspect.

With the vibration isolator according to a seventh aspect, the second protrusion portion has a wedge shape thick on the rear end side and gradually thinning toward the distal end side. This ensures facilitating the press-fitting of the press-fit portion to the press-fitted portion and the press-fit portion can be less likely to come off from the press-fitted portion, in addition to the effects of the first aspect.

DESCRIPTION OF EMBODIMENTS

Figure 1:
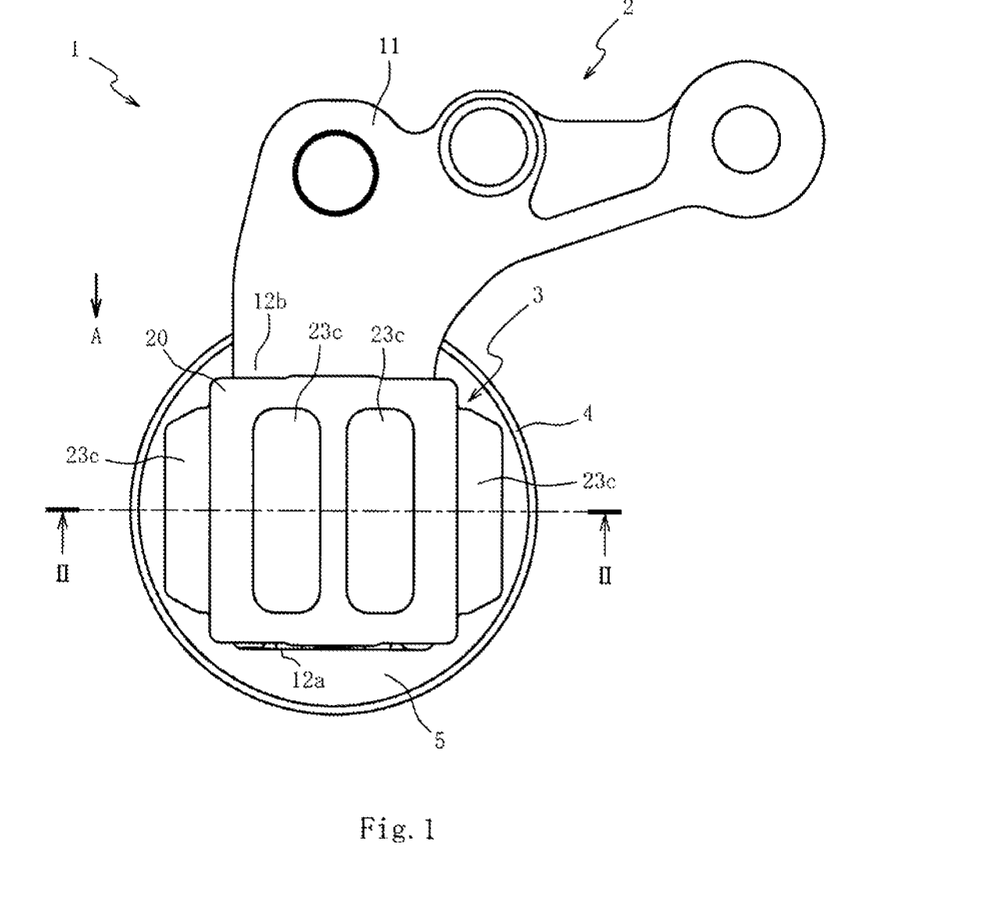
FIG. 1 is a plan view of a vibration isolator according to a first embodiment of the present invention.
Figure 2:
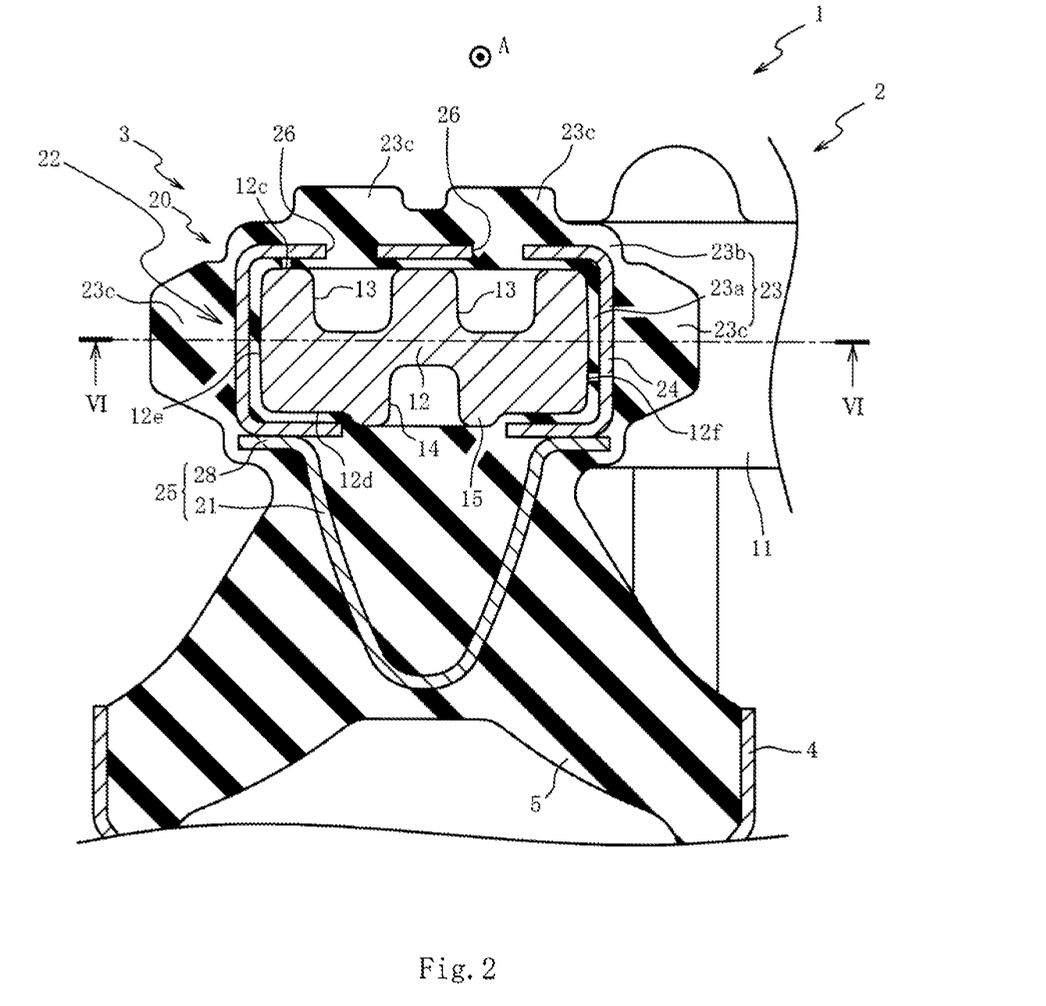
FIG. 2 is a cross-sectional view of the vibration isolator taken along the line II-II of FIG. 1.

The following describes preferable embodiments of the present invention with reference to the attached drawings. First, the following describes a vibration isolator 1 according to a first embodiment of the present invention with reference to FIG. 1 and FIG. 2. FIG. 1 is a plan view of the vibration isolator 1. FIG. 2 is a cross-sectional view of the vibration isolator 1 taken along the line II-II of FIG. 1. FIG. 2 omits the illustration of the lower side of the vibration isolator 1 and a part of a base portion 11 of a bracket 2. This embodiment gives the description with the up-down direction in the paper of FIG. 2 as the up-down direction of the vibration isolator 1 and the right-left direction in the paper of FIG. 2 as the right-left direction of the vibration isolator 1. Note that the up-down direction and the right-left direction of the vibration isolator 1 do not always match an up-down direction and a right-left direction of a vehicle to which the vibration isolator 1 is mounted.

The vibration isolator 1 is a liquid sealing type vibration isolator that supports and fixes a vibration source side to a support body side while reducing a transmission of a vibration from the vibration source side (not illustrated) such as an engine to the support body side (not illustrated) such as a vehicle body. As illustrated in FIG. 1 and FIG. 2, the vibration isolator 1 includes the bracket 2 mounted to the vibration source side, a first attachment tool 3 mounted to the bracket 2, a tubular second attachment tool 4 mounted to the support body side, and an vibration-isolation base 5 made of an elastic body (rubber and thermoplastic elastomer) that couples the first attachment tool 3 and the second attachment tool 4 together. The second attachment tool 4 is mounted to the support body side via a second mounting bracket (not illustrated) fixed to the support body side.

The bracket 2 is a member made of an aluminum alloy having rigidity higher than that of the elastic body (vibration-isolation base 5). The bracket 2 includes the base portion 11 fixed to the vibration source side and a press-fit portion 12 projecting out from the base portion 11 in one direction (press fitting direction A). The press-fit portion 12 is an approximately rectangular parallelepiped-shaped member that is press-fitted to a press-fitted portion 20 (described later) of the first attachment tool 3. The press-fit portion 12 has an end portion as a distal end 12a away from the base portion 11 and an end portion as a rear end 12b continuous with the base portion 11. The press-fit portion 12 is press-fitted to the press-fitted portion 20 in the press fitting direction A, a direction heading from the rear end 12b toward the distal end 12a.

Figure 3:
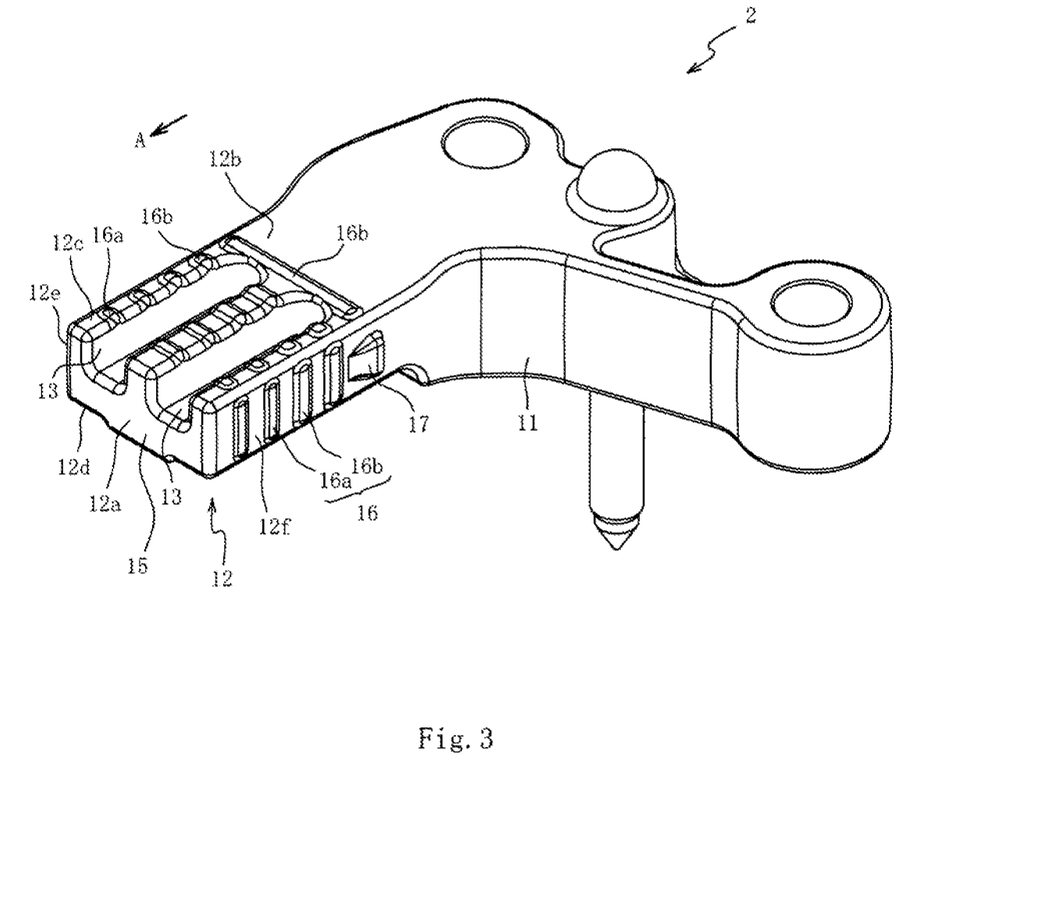
FIG. 3 is a perspective view of a bracket.

Here, the following describes the press-fit portion 12 of the bracket 2 in detail with reference to FIG. 3 in addition to FIG. 2. FIG. 3 is a perspective view of the bracket 2. As illustrated in FIG. 2 and FIG. 3, the press-fit portion 12 is symmetrically formed. The press-fit portion 12 having the rectangular parallelepiped shape has outer surfaces 12c, 12d, 12e, 12f, four surfaces other than the distal end 12a, approximately parallel to the press fitting direction A. The top surface of the press-fit portion 12 is the outer surface 12c, the lower surface is the outer surface 12d, the side surface on the left side of the paper of FIG. 2 is the outer surface 12e, and the side surface on the right side of the paper of FIG. 2 is the outer surface 12f.

Two groove portions 13 are formed on the outer surface 12c and one groove portion 14 is formed on the center in the right-left direction of the outer surface 12d. The groove portions 13, 14 are parts to reduce the weight of the bracket 2 and extend in the press fitting direction A. The groove portions 13 are open to the distal end 12a, and the groove portion 14 does not open to the distal end 12a.

A bulge portion 15 that slightly bulges with respect to both right and left sides is disposed at the center in the right-left direction on the outer surface 12d of the press-fit portion 12. The bulge portion 15 is a part formed corresponding to the shape of the inner surface of the press-fitted portion 20 to which the press-fit portion 12 is press-fitted.

The press-fit portion 12 includes a plurality of first protrusion portions 16 and second protrusion portions 17. The plurality of first protrusion portions 16 project in a direction perpendicular to the press fitting direction A. The second protrusion portions 17 are located on the rear end 12b side of the first protrusion portions 16 and project in a direction perpendicular to the press fitting direction A. The first protrusion portions 16 are each formed into an arch shape in cross section and extend in a direction approximately perpendicular to the press fitting direction A.

The plurality of first protrusion portions 16 are disposed on the outer surfaces 12c, 12d, 12e, 12f avoiding the groove portion 14. The plurality of first protrusion portions 16 are located separated from one another in the press fitting direction A. Five protrusions of the first protrusion portions 16 are arranged on the outer surfaces 12c, 12d in the press fitting direction A, and four protrusions of the first protrusion portions 16 are arranged on the outer surfaces 12e, 12f in the press fitting direction A.

The plurality of first protrusion portions 16 include distal end protrusion portions 16a as two protrusions on the distal end 12a side and rear end protrusion portions 16b on the rear end 12b side with respect to the distal end protrusion portions 16a. The distal end protrusion portions 16a have a height H1 (see FIG. 5) projecting from the outer surfaces 12c, 12d, 12e, 12f configured smaller than a height H2 (see FIG. 5) of the rear end protrusion portions 16b.

The bulge portion 15 disposed on the outer surface 12d does not include the first protrusion portions 16, and the first protrusion portions 16 are coupled to both right and left sides of the bulge portion 15. This is because that the heights H1, H2 of the first protrusion portions 16 are configured smaller than the height of the bulge portion 15 bulging from the outer surface 12d.

The second protrusion portions 17 are pair of parts disposed at the respective outer surfaces 12e, 12f. The second protrusion portions 17 are located on the rear end 12b side of the first protrusion portions 16 of the outer surfaces 12e, 12f. The second protrusion portions 17 have a wedge shape where the second protrusion portions 17 on the rear end 12b side are disposed upright approximately perpendicular from the outer surfaces 12e, 12f and the second protrusion portions 17 on the distal end 12a side are inclined. In more detail, the wedge shape is a shape thick on the rear end 12b side and gradually thin toward the distal end 12a side. The inclination of the distal end 12a side is more gradual compared with the rear end 12b side. The second protrusion portion 17 has a trapezoidal shape where the side on the distal end 12a side is smaller than the side on the rear end 12b side in side view (when viewed from the perpendicular direction of the outer surfaces 12e, 12f).

The second protrusion portion 17 has a maximum height H3 (see FIG. 6) configured larger than the heights H1, H2 of the first protrusion portions 16. The second protrusion portion 17 has a width (dimension in a direction from the outer surface 12c toward the outer surface 12d) configured smaller than a width of the first protrusion portion 16.

The description will be given returning to FIG. 1 and FIG. 2. The first attachment tool 3 includes the press-fitted portion 20 to which the press-fit portion 12 of the bracket 2 is press-fitted and a boss portion 21 projecting downward from the press-fitted portion 20. The vibration-isolation base 5 is coupled to this boss portion 21, and the boss portion 21 is located on a center axis of the second attachment tool 4. Therefore, inputting a load to the vibration isolator 1 mainly vibrates the first attachment tool 3 with respect to the second attachment tool 4 in an axis direction (up-down direction) of the second attachment tool 4.

The press-fitted portion 20 is an approximately square tubular-shaped member having open both ends. The axis direction of the approximately square tubular-shaped press-fitted portion 20 is the press fitting direction A. The inner surfaces of the press-fitted portion 20 are configured approximately parallel to the press fitting direction A (axis direction).

The press-fitted portion 20 includes a rigid portion 22 and an elastic portion 23. The rigid portion 22 made of steel has open both ends and approximately square tubular shape. The elastic portion 23 is made of an elastic body vulcanization-bonded to the inner surface and the outer surface of the rigid portion 22. A part of the rigid portion 22 constitutes the boss portion 21 to which the vibration-isolation base 5 is vulcanization-bonded. A part of the elastic portion 23 (elastic film portion 23a) is filled in the inner surface side of the boss portion 21.

The elastic portion 23 is an elastic body having a rigidity lower than those of the rigid portion 22 and the bracket 2, and vulcanization molding is performed on the elastic portion 23 integrally with the vibration-isolation base 5. The elastic portion 23 includes a filmy elastic film portion 23a disposed at the inner surface of the rigid portion 22, a filmy outer surface film portion 23b disposed on the outer surface of the rigid portion 22, and a plurality of stopper portions 23c projecting out from the outer surface film portion 23b.

The elastic film portion 23a is a part sandwiched between the press-fit portion 12 and the rigid portion 22 in a state where the press-fit portion 12 is press-fitted to the press-fitted portion 20 (hereinafter referred to as "press fitting state"). This allows the elastic film portion 23a to prevent electrolytic corrosion of the press-fit portion 12 made of aluminum alloy with the rigid portion 22 made of steel.

In a state where the press-fit portion 12 is not press-fitted to the press-fitted portion 20 (hereinafter referred to as "non-press fitting state"), distances (a right-to-left dimension and a top-to-bottom dimension) between opposed inner surfaces of the elastic film portion 23a are configured slightly smaller than the right-to-left dimension and the top-to-bottom dimension of the press-fit portion 12. Therefore, in the press fitting state, the elastic film portion 23a is compressed between the press-fit portion 12 and the rigid portion 22, and the press-fit portion 12 can be less likely to come off from the press-fitted portion 20.

In the non-press fitting state, the inner surfaces of the elastic film portion 23a are configured to be approximately made flush across the overall length in the press fitting direction A and approximately parallel (distances between the opposed inner surfaces are approximately constant) to the press fitting direction A. Actually, as described later, a draft is provided at the inner surface of the elastic film portion 23a; therefore, the inner surface of the elastic film portion 23a in the non-press fitting state is slightly inclined with respect to the press fitting direction A. The inner surface of the elastic film portion 23a in the cross section perpendicular to the press fitting direction A is formed into an approximately square shape and a part of the elastic film portion 23a on the boss portion 21 side is depressed. The bulge portion 15 of the press-fit portion 12 is fitted to this depressed part.

The outer surface film portion 23b is a part that couples the plurality of stopper portions 23c together and covers the outer surface of the rigid portion 22. This ensures facilitating supplying the elastic body to a required location of the rigid portion 22 during the vulcanization molding. Additionally, the outer surface film portion 23b passes through outside the open end portions 24a, 24b and then is continuous with approximately all of the side edges of the elastic film portion 23a. Therefore, even when a load in the press fitting direction A is applied to the elastic film portion 23a when the press-fit portion 12 is press-fitted to the press-fitted portion 20, the elastic film portion 23a can be less likely to peel off from the rigid portion 22.

The stopper portions 23c are parts disposed extending in the press fitting direction A. Each one of the plurality of stopper portions 23c is disposed on both right and left sides of the outer surface film portion 23b and the two stopper portions 23c are disposed on the upper portion of the outer surface film portion 23b. Here, a second mounting bracket (not illustrated) to which the second attachment tool 4 is mounted is formed into a gate shape covering the first attachment tool 3. When the first attachment tool 3 and the second attachment tool 4 relatively move by the load input, the stopper portions 23c can buffer a collision of the first attachment tool 3 with the second mounting bracket.

Figure 4:
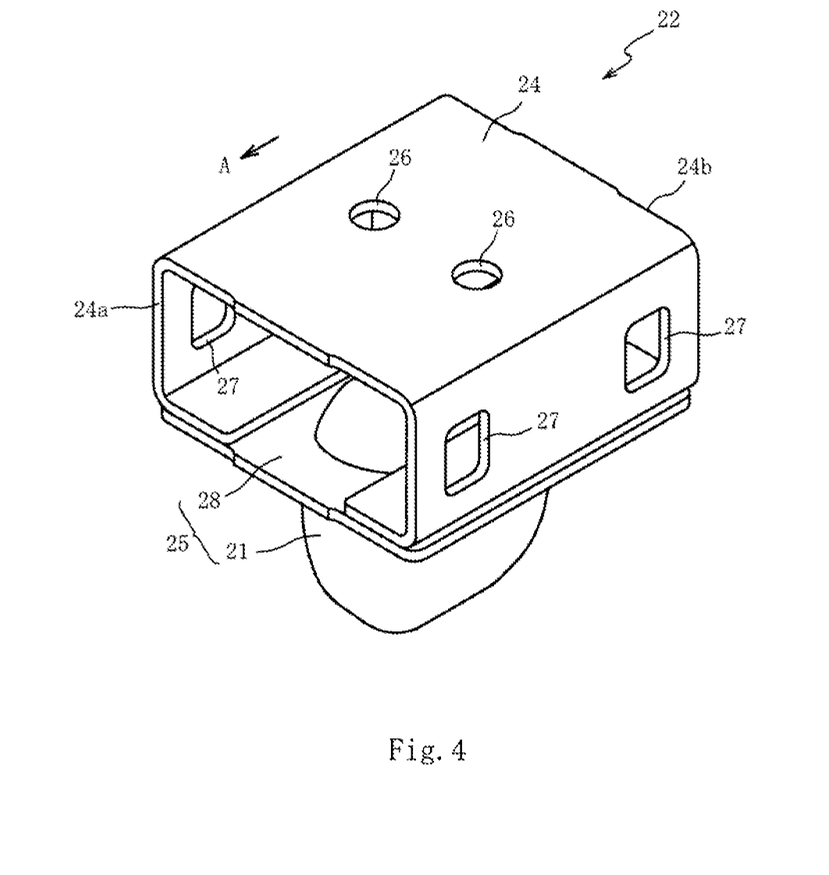
FIG. 4 is a perspective view of a rigid portion.

The following describes the rigid portion 22 in detail with reference to FIG. 4 in addition to FIG. 2. FIG. 4 is a perspective view of the rigid portion 22. As illustrated in FIG. 2 and FIG. 4, the rigid portion 22 is a member made of steel having a rigidity higher than those of the elastic bodies (the vibration-isolation base 5 and the elastic portion 23) and has the inner surfaces configured approximately parallel to the press fitting direction A. The rigid portion 22 includes an approximately square tubular-shaped first metal fitting 24 where a part of an outer periphery on the boss portion 21 side is divided and a second metal fitting 25 that couples the divided parts of the first metal fitting 24.

The first metal fitting 24 is formed by performing a bending work on a steel plate. The first metal fitting 24 has an approximately square tubular shape with the press fitting direction A as the axis direction and includes open end portions 24a, 24b that open on both front and rear ends in the press fitting direction A (both ends in the axis direction). The open end portion 24a side and the open end portion 24b side of the rigid portion 22 (the first metal fitting 24 and the second metal fitting 25) are formed symmetrical with respect to the center of the front and rear in the press fitting direction A. The open end portion 24a side and the open end portion 24b side of the press-fitted portion 20 where the elastic portion 23 is vulcanization-bonded to the rigid portion 22 are also formed symmetrical with respect to the center of the front and rear in the press fitting direction A. This allows the press-fit portion 12 to be press-fitted from both of the open end portion 24a side and the open end portion 24b side of the press-fitted portion 20.

The first metal fitting 24 has two through-holes 26 penetrating its top surface (the surface on the side opposite to the second metal fitting 25) in the plate thickness direction and has four recesses 27 penetrating the side surfaces in the plate thickness direction. These through-holes 26 and recesses 27 are covered with the elastic film portion 23a. These through-holes 26 and recesses 27 allow facilitating come-and-go of the elastic body between the inner surface side and the outer surface side of the rigid portion 22 during the vulcanization molding of the elastic portion 23 made of the elastic body, ensuring facilitating the filling work of the elastic body.

The two through-holes 26 are located corresponding to the two stopper portions 23c at the upper portion of the outer surface film portion 23b. The recesses 27 are located corresponding to the respective stopper portions 23c disposed on both right and left sides of the outer surface film portion 23b. Consequently, the elastic body can be easily filled to the parts corresponding to the stopper portions 23c where the rubber thickness is thick.

The recesses 27 are parts where the inner surfaces of the first metal fitting 24 are depressed with respect to both front and rear sides in the press fitting direction A. The right and left pairs of four recesses 27 are located close to the respective open end portions 24a, 24b on both ends at the front and the rear. In the press fitting state, the second protrusion portions 17 are located in any one of the right and left pairs of recesses 27 on the open end portion 24a side or the open end portion 24b side.

The second metal fitting 25 includes a flat plate-shaped flat plate 28 and the boss portion 21, which projects downward from the flat plate 28. The second metal fitting 25 is formed by performing presswork on a flat plate-shaped steel plate. The second metal fitting 25 and the first metal fitting 24 are joined by spot welding on the four corners of the flat plate 28.

Since the divided parts of the first metal fitting 24 where a part of the outer periphery is divided are coupled with the second metal fitting 25, the inner surface of the rigid portion 22 is depressed outside (the boss portion 21 side) at the coupling part of the first metal fitting 24 with the second metal fitting 25. Thus, the inner surface of the rigid portion 22 is depressed because of the manufacturing method of the rigid portion 22; therefore, disposing the bulge portion 15 on the press-fit portion 12 corresponding to the depressed portion allows uniformly approaching a space between the rigid portion 22 and the press-fit portion 12 in the press fitting state entirely. By uniformly approaching the space between the rigid portion 22 and the press-fit portion 12, an elastic reaction force of the elastic film portion 23a sandwiched between the rigid portion 22 and the press-fit portion 12 can be uniformly approached entirely and the press-fit portion 12 can be less likely to come off from the press-fitted portion 20.

Figure 5:
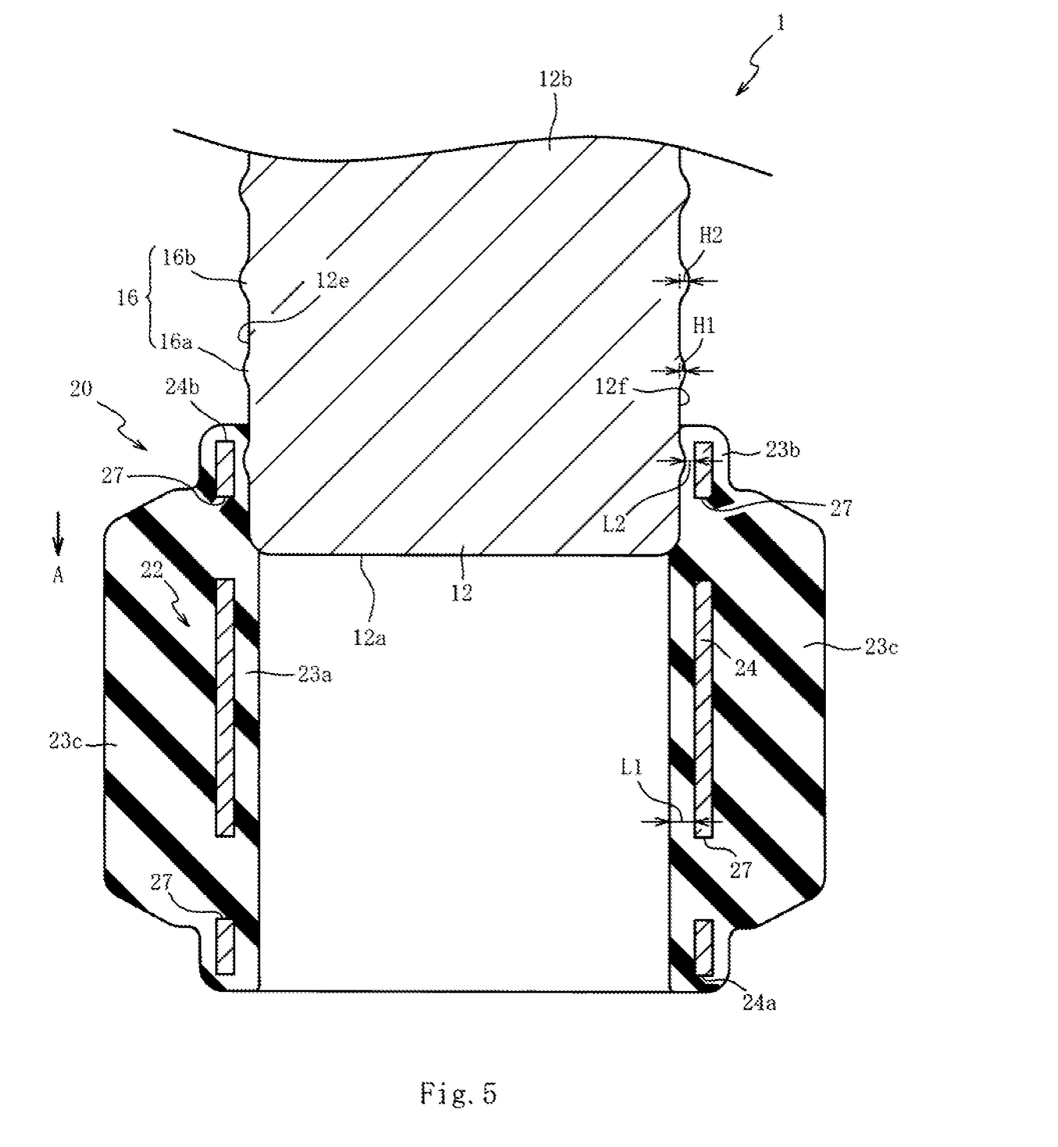
FIG. 5 is a cross-sectional view of the vibration isolator illustrating an early stage in press fitting.
Figure 6:
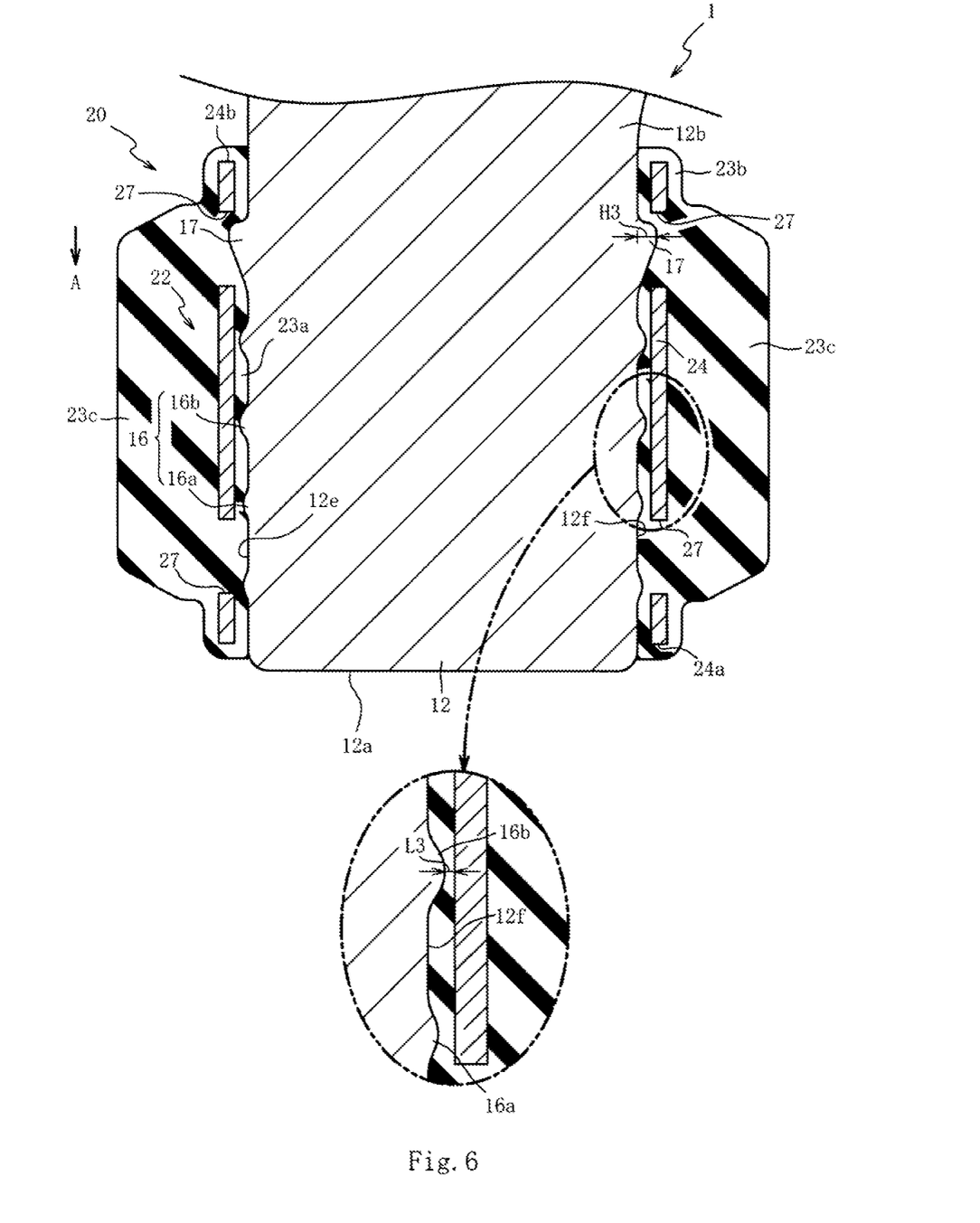
FIG. 6 is a cross-sectional view of the vibration isolator taken along the line VI-VI of FIG. 2.

Next, the following describes the press-fitting that press-fits the press-fit portion 12 to the press-fitted portion 20 and the press fitting state after the completion of the press-fitting in more detail with reference to FIG. 2, FIG. 5, and FIG. 6. FIG. 5 is a cross-sectional view of the vibration isolator 1 illustrating an early stage in the press-fitting. FIG. 6 is a cross-sectional view of the vibration isolator 1 taken along the line VI-VI of FIG. 2. FIG. 5 and FIG. 6 omit the base portion 11 of the bracket 2, the second attachment tool 4, and the vibration-isolation base 5. For ease of understanding, FIG. 5 and FIG. 6 exaggeratedly illustrate a thickness L1 of the elastic film portion 23a in the non-press fitting state.

As illustrated in FIG. 2 and FIG. 5, press-fitting the press-fit portion 12 to the press-fitted portion 20 in the press fitting direction A compresses and deforms the elastic film portion 23a having the thickness L1 in the non-press fitting state between the press-fit portion 12 and the rigid portion 22. The thickness L1 of the elastic film portion 23a in the non-press fitting state slightly increases as approaching from the open end portion 24b toward the open end portion 24a. That is, the inner surface of the elastic film portion 23a in the non-press fitting state is slightly inclined with respect to the press fitting direction A. This inclination is a draft to facilitate demolding the press-fitted portion 20 from a mold after the vulcanization molding of the elastic film portion 23a. Since the change in the thickness of the elastic film portion 23a for draft is small, the following gives the description using the identical reference numeral, the thickness L1, as the thickness of the elastic film portion 23a at any position.

Since the inner surfaces of the rigid portion 22 are parallel to the outer surfaces 12c, 12d, 12e, 12f, between the outer surfaces 12c, 12d, 12e, 12f and the inner surfaces of the rigid portion 22, a compression ratio of the elastic film portion 23a slightly increases in association with the change in the thickness L1 as approaching from the open end portion 24b side toward the open end portion 24a side. As this compression ratio becomes large, the elastic reaction force applied from the elastic film portion 23a to the press-fit portion 12 increases.

At the early stage in the press-fitting where only the distal end protrusion portions 16a on the distal end 12a side are press-fitted among the first protrusion portions 16 as illustrated in FIG. 5, the compression ratio of the elastic film portion 23a increases between the distal end protrusion portions 16a and the inner surfaces of the rigid portion 22 by the amount of the height H1 of the distal end protrusion portions 16a projecting from the outer surfaces 12c, 12d, 12e, 12f. This compression ratio is a value found as follows. A thickness L2 of the elastic film portion 23a between the distal end protrusion portion 16a and the inner surface of the rigid portion 22 is subtracted from the thickness L1 of the elastic film portion 23a in the non-press fitting state, and the found value is further divided by the thickness L1.

Further, press-fitting the press-fit portion 12 in the press fitting direction A also press-fits the rear end protrusion portions 16b on the rear end 12b side among the first protrusion portions 16 in the latter stage in the press-fitting and the press fitting state illustrated in FIG. 6. Since the height H2 of the rear end protrusion portion 16b is larger than the height H1 of the distal end protrusion portion 16a, the compression ratio of the elastic film portion 23a further increases between the rear end protrusion portion 16b and the inner surface of the rigid portion 22. This compression ratio is a value found as follows. A thickness L3 of the elastic film portion 23a between the rear end protrusion portion 16b and the inner surface of the rigid portion 22 is subtracted from the thickness L1 of the elastic film portion 23a in the non-press fitting state, and the found value is further divided by the thickness L1.

Since a distance from the distal end to the distal end of the right and left pair of second protrusion portions 17 is larger than a distance between the inner surfaces in the right-left direction dimension of the rigid portion 22, the press-fit portion 12 is press-fitted to the press-fitted portion 20 while the rigid portion 22 is deformed with the second protrusion portions 17 in the press-fitting. The rigid portion 22 recovers the shape and dimensions before the press-fitting after the deformation (in the press-fitting state), and the second protrusion portions 17 overlap with the rigid portion 22 as viewed in the press fitting direction. As long as the second protrusion portions 17 overlap with the rigid portion 22 as viewed in the press fitting direction in the press fitting state, the rigid portion 22 may elastically deform with the second protrusion portions 17.

With the vibration isolator 1 in the press fitting state illustrated in FIG. 2 and FIG. 6, the elastic film portion 23a compressively deforms between the outer surfaces 12c, 12d, 12e, 12f and the first protrusion portions 16, and the rigid portion 22, and the press fitting state is maintained by the elastic reaction force of the elastic film portion 23a. Especially, the first protrusion portions 16 project from the outer surfaces 12c, 12d, 12e, 12f, the first protrusion portions 16 bite into the elastic film portion 23a. Therefore, the press-fit portion 12 can be less likely to come off from the press-fitted portion 20.

Furthermore, the right and left pair of second protrusion portions 17 on the press-fit portion 12 are located in the right and left pair of recesses 27 on the rigid portion 22, and a part of the second protrusion portions 17 overlap with the rigid portion 22 as viewed in the press fitting direction (as viewed in the press fitting direction A). Thus, since the members having the rigidity higher than that of the elastic film portion 23a, the elastic body, overlap as viewed in the press-fitting direction, even when the elastic film portion 23a is deteriorated and the large load is input to the vibration isolator 1, the press-fit portion 12 can be less likely to come off from the press-fitted portion 20 further due to the load input.

A tolerance occurs in the recess 27 and the second protrusion portion 17 as a manufacturing error. This possibly results in relative movement of the press-fit portion 12 and the press-fitted portion 20 by the amount of tolerance during the load input. However, since the first protrusion portions 16 bite into the elastic film portion 23a, the relative movement of the recesses 27 and the second protrusion portions 17 by the amount of tolerance can be reduced. As the results, the use of both of the first protrusion portions 16 and the second protrusion portions 17 allows the press-fit portion 12 of the bracket 2 to be less likely to come off from the press-fitted portion 20 of the first attachment tool 3.

Especially, since the plurality of first protrusion portions 16 are located separated from one another in the press fitting direction A, the first protrusion portions 16 bite into the elastic film portion 23a at the plurality of locations in the press fitting direction A. Accordingly, when the load is input to the vibration isolator 1, even when the biting of the first protrusion portions 16 into the elastic film portion 23a is released on the distal end 12a side, the biting of the first protrusion portions 16 into the elastic film portion 23a can be maintained on the rear end 12b side. Conversely, while the load is input, even when the biting of the first protrusion portions 16 into the elastic film portion 23a is released on the rear end 12b side, the biting of the first protrusion portions 16 into the elastic film portion 23a can be maintained on the distal end 12a side. Accordingly, by locating the plurality of first protrusion portions 16 to be separated from one another in the press fitting direction A, the press-fit portion 12 can be less likely to come off from the press-fitted portion 20 further.

In the case where the vibration isolator 1 is one (for example, an engine mount) used under a high temperature environment such as an engine room, the elastic film portion 23a bitten by the first protrusion portions 16 gradually hardens. Therefore, the press-fit portion 12 can be less likely to come off from the press-fitted portion 20 further.

The second protrusion portions 17 have the wedge shape where the second protrusion portions 17 on the rear end 12b side are disposed upright approximately perpendicular from the outer surfaces 12e, 12f and the second protrusion portions 17 on the distal end 12a side are inclined. The second protrusion portions 17 are thick on the rear end 12b side and become gradually thin toward the distal end 12a side. Therefore, the press-fit portion 12 can be easily press-fitted to the press-fitted portion 20. Additionally, in the press fitting state, the second protrusion portions 17 are hooked to the side edges of the recesses 27, and thus, the press-fit portion 12 can be less likely to come off from the press-fitted portion 20.

The first protrusion portions 16 have the arch shape in cross section and extend in the direction approximately perpendicular to the press fitting direction A. Therefore, the first protrusion portions 16 can be less likely to move to the rear end 12b side with respect to the press-fitted portion 20 to the approximately same extent as the first protrusion portions 16 being less likely to move to the distal end 12a side with respect to the press-fitted portion 20. This configuration allows reducing the excessive movement of the press-fit portion 12 to the distal end 12a side with respect to the press-fitted portion 20 and an excessive shear stress inside the elastic film portion 23a.

Since the recesses 27 are covered with the elastic film portion 23a, locating the second protrusion portions 17 in the recesses 27 compressively deforms the elastic film portion 23a between the peripheral edges of the recesses 27 and the second protrusion portions 17. The elastic reaction force of the elastic film portion 23a sandwiched between the peripheral edges of the recesses 27 and the second protrusion portions 17 ensures causing the press-fit portion 12 and the press-fitted portion 20 to be less likely to relatively move. As a result, the press-fit portion 12 can be less likely to come off from the press-fitted portion 20 further.

Here, in the case where the recesses 27 where the inner surfaces of the rigid portion 22 are depressed have bottoms, when the recesses 27 are covered with the elastic film portion 23a, the second protrusion portions 17 press the bottoms of the recesses 27 via the elastic film portion 23a and the rigid portion 22 possibly deforms. This fails to maintain the overlap of a part of the second protrusion portions 17 with the rigid portion 22 as viewed in the press fitting direction in association with the deformation of the rigid portion 22. Therefore, the press-fit portion 12 is possibly likely to come off from the press-fitted portion 20.

However, in the present embodiment, since the recesses 27 are formed penetrating the rigid portion 22, the recesses 27 do not have bottoms, thereby ensuring preventing the deformation of the rigid portion 22 caused by pressing the bottoms of the recesses 27 by the second protrusion portions 17. This allows reducing the deformation of the rigid portion 22 and the ease of coming off of the press-fit portion 12 from the press-fitted portion 20.

In the plurality of first protrusion portions 16, the height H2 of the rear end protrusion portions 16b on the rear end 12b side is configured larger than the height H1 of the distal end protrusion portions 16a on the distal end 12a side. In the press-fitting of the press-fit portion 12 to the press-fitted portion 20, a distance of sliding with the inner surface (elastic film portion 23a) of the press-fitted portion 20 becomes long as the first protrusion portions 16 positioned on the distal end 12a side of the press-fit portion 12. Since the inner surfaces of the rigid portion 22 are approximately parallel to the press fitting direction A, when the elastic film portion 23a having the thickness L1 compressively deforms between the first protrusion portion 16 and the rigid portion 22, the larger the heights H1, H2 of the first protrusion portions 16 are, the larger the load applied from the first protrusion portions 16 to the elastic film portion 23a is.

Therefore, as described above, the compression ratio (L1−L3)/L1 of the elastic film portion 23a between the rear end protrusion portion 16b and the rigid portion 22 in the press fitting state illustrated in FIG. 6 becomes larger than the compression ratio (L1−L2)/L1 of the elastic film portion 23a between the distal end protrusion portion 16a and the rigid portion 22 at the early stage in the press-fitting illustrated in FIG. 5. Accordingly, at the early stage in the press-fitting, the load in the press fitting direction A applied from the distal end protrusion portion 16a to the elastic film portion 23a can be decreased; therefore, the shear stress occurred between a part near the open end portion 24b of the rigid portion 22 and the elastic film portion 23a can be decreased.

At the positions of the distal end protrusion portions 16a of FIG. 5, the thickness L1 of the elastic film portion 23a in no-load state slightly decreases by the draft compared with that at the positions of the rear end protrusion portions 16b of FIG. 6; therefore, the compression ratio (L1−L2)/L1 becomes smaller than the compression ratio (L1−L3)/L1. As a result, at the early stage in the press-fitting, the load in the press fitting direction A applied from the distal end protrusion portion 16a to the elastic film portion 23a can be further decreased; therefore, the shear stress generated between the part near the open end portion 24b of the rigid portion 22 and the elastic film portion 23a can be decreased.

Since the part near the open end portion 24b of the rigid portion 22 is likely to be a starting point where the elastic film portion 23a peels off from the rigid portion 22. Accordingly, by decreasing the shear stress at the position, the elastic film portion 23a can be less likely to peel off from the rigid portion 22. On the other hand, in the press fitting state, the compression ratio (L1−L3)/L1 of the elastic film portion 23a between the rear end protrusion portion 16b and the rigid portion 22 is large; therefore, the large elastic reaction force of the elastic film portion 23a at the part can cause the press-fit portion 12 to be less likely to come off from the press-fitted portion 20 further.

Furthermore, even when the slight change in the thickness L1 of the elastic film portion 23a caused by the draft is taken into consideration, the elastic reaction force applied from the elastic film portion 23a to the distal end protrusion portion 16a having the height H1 smaller than the height H2 becomes smaller than the elastic reaction force applied from the elastic film portion 23a to the rear end protrusion portion 16b having the height H2 in a state where the rear end protrusion portion 16b contacts the elastic film portion 23a in the press-fitting. Accordingly, while the load in the press fitting direction A applied from the distal end protrusion portion 16a where the distance of sliding with the inner surface of the elastic film portion 23a is long to the elastic film portion 23a is decreased, the distance of sliding of the rear end protrusion portion 16b where the load in the press fitting direction A applied to the elastic film portion 23a is large with the inner surface of the elastic film portion 23a can be shortened. Therefore, the elastic film portion 23a can be less likely to be shaved by the distal end protrusion portion 16a in the press-fitting. Additionally, even when the elastic film portion 23a is likely to be shaved by the rear end protrusion portion 16b, a distance shaved by the rear end protrusion portion 16b can be shortened. This ensures reducing the shaving of the elastic film portion 23a and the decrease in elastic reaction force of the elastic film portion 23a, and this ensures causing the press-fit portion 12 to be less likely to come off from the press-fitted portion 20.

The second protrusion portions 17 are located on the rear end 12b side of the plurality of first protrusion portions 16 on the outer surfaces 12e, 12f, and the recesses 27 inside of which the second protrusion portions 17 are located are disposed close to the open end portion 24b of the rigid portion 22. Therefore, a distance that the second protrusion portions 17 slide with the inner surfaces of the press-fitted portion 20 can be shortened. The height H3 of the second protrusion portion 17 is larger than the heights H1, H2 of the first protrusion portions 16. Therefore, while the large load in the press fitting direction A is applied from the second protrusion portion 17 to the elastic film portion 23a in the press-fitting, the distance that the load is applied can be shortened. As a result, the elastic film portion 23a can be less likely to peel off from the rigid portion 22.

Furthermore, in the press-fitting, the press-fit portion 12 is press-fitted to the press-fitted portion 20 while the second protrusion portions 17 deform the rigid portion 22. Therefore, when the distance to deform the rigid portion 22 with the second protrusion portions 17 in the press-fitting is long, the rigid portion 22 elastically deforms and a welded part of the first metal fitting 24 with the second metal fitting 25 is broken. This possibly causes a part of the second protrusion portions 17 to be less likely to overlap with the rigid portion 22 in the press fitting state.

However, in the present embodiment, by the positions of the second protrusion portions 17 and the recesses 27, the length of the part of the rigid portion 22 deformed with the second protrusion portions 17 in the press-fitting can be shortened. Accordingly, the rigid portion 22 can be less likely to be elastically deformed, and the welded part of the first metal fitting 24 with the second metal fitting 25 can be less likely to be broken. As a result, the ease of coming off of the press-fit portion 12 from the press-fitted portion 20 in association with the plastic deformation of the rigid portion 22 can be reduced and also durability of the rigid portion 22 can be improved.

The right and left pairs of respective recesses 27 are disposed on the open end portion 24a, 24b sides on both sides of the rigid portion 22. Therefore, the press-fit portion 12 can be press-fitted from both of the open end portions 24a, 24b of the press-fitted portion 20 and the right and left pair of second protrusion portions 17 can be located inside the right and left pair of recesses 27. As a result, since the press-fit portion 12 can be press-fitted without confirmation of the direction of the press-fitted portion 20 in the press-fitting, press-fit working efficiency can be improved. Especially, although the recesses 27 are covered with the elastic portion 23 and therefore cannot be visually perceived, the second protrusion portions 17 can be located inside the recesses 27 without the confirmation of the positions of the recesses 27 and the press-fit working efficiency can be improved.

The second protrusion portions 17 may be disposed not on the outer surfaces 12e, 12f but on the outer surfaces 12c, 12d. However, the widths of the outer surfaces 12c, 12d (the dimensions between the outer surfaces 12e, 12f) and the widths of the parts of the rigid portion 22 opposed to the outer surfaces 12c, 12d are larger than the widths of the outer surfaces 12e, 12f (the dimensions between the outer surfaces 12c, 12d) and the widths of the parts of the rigid portion 22 opposed to the outer surfaces 12e, 12f. Therefore, compared with the case where the parts of the rigid portion 22 opposed to the outer surfaces 12e, 12f are deformed with the second protrusion portions 17 in the press-fitting, the parts of the rigid portion 22 opposed to the outer surfaces 12c, 12d are more likely to deform with the second protrusion portions 17 in the press-fitting.

In the present embodiment, since the second protrusion portions 17 are disposed on the outer surfaces 12e, 12f, the parts of the rigid portion 22 opposed to the outer surfaces 12e, 12f can be comparatively less likely to deform in the press-fitting with the second protrusion portions 17. This allows reducing the ease of coming off of the press-fit portion 12 from the press-fitted portion 20 in association with the plastic deformation of the rigid portion 22. Additionally, the breakage of the welded part of the first metal fitting 24 with the second metal fitting 25 is reduced and the durability of the rigid portion 22 can be improved.

The first protrusion portion 16 has the width (the dimension from the outer surface 12c to the outer surface 12d) is configured larger than the width of the second protrusion portion 17. Thus, when the rigid portion 22 deforms with the second protrusion portions 17 in the press-fitting, the rigid portion 22 is strongly pressed against a part of the first protrusion portions 16 positioned outside with respect to both ends in the width direction (up-down direction) of the second protrusion portions 17. The elastic reaction force of the elastic film portion 23a between a part of the first protrusion portions 16 and the rigid portion 22 becomes strong, and the deformation of the rigid portion 22 with the second protrusion portions 17 can be easily returned to the original shape when the second protrusion portions 17 are located in the recesses 27. As a result, the second protrusion portions 17 and the rigid portion 22 can easily overlap as viewed in the press fitting direction and the press-fit portion 12 can be less likely to come off from the press-fitted portion 20.

Figure 7:
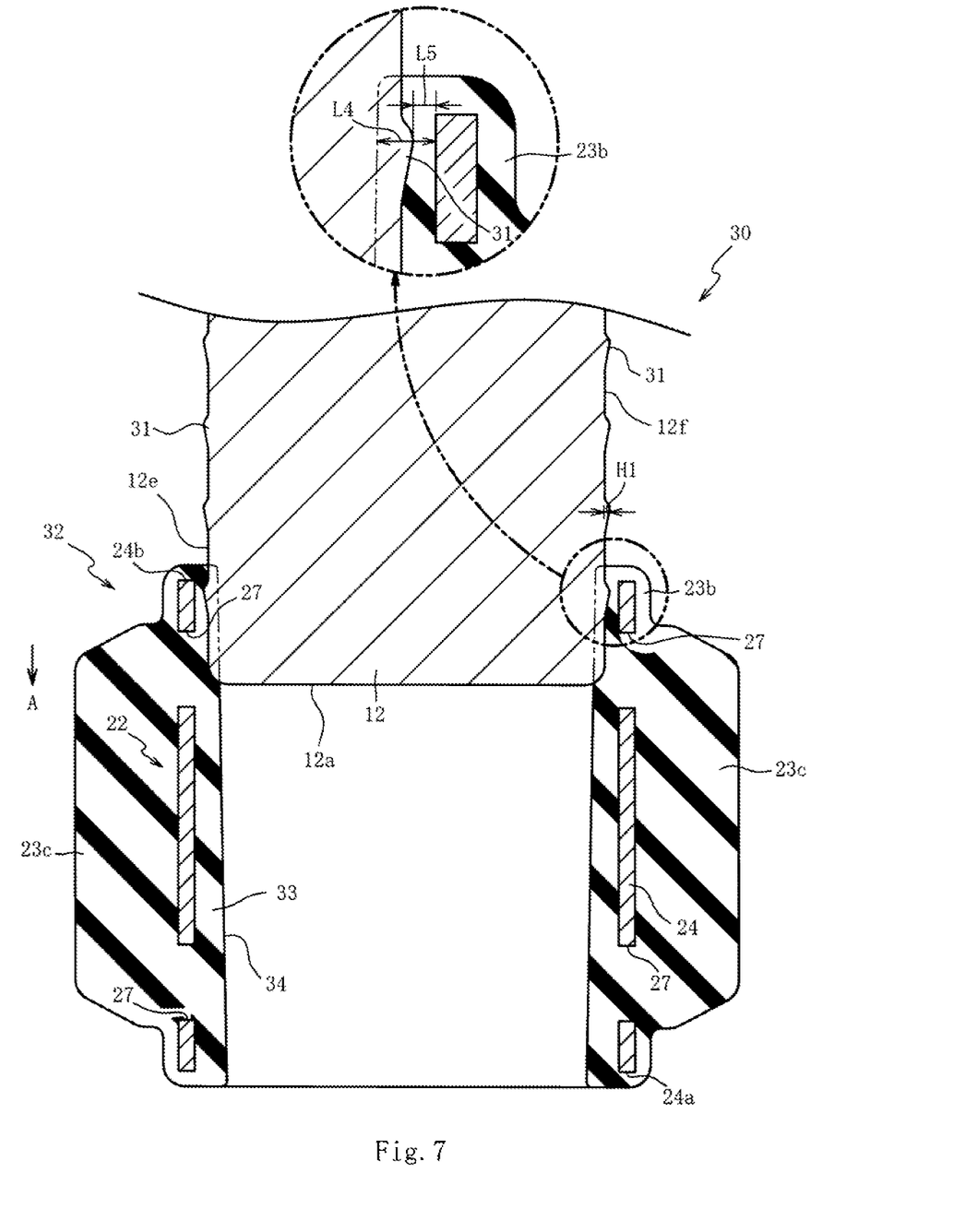
FIG. 7 is a cross-sectional view of a vibration isolator illustrating an early stage in press fitting in a second embodiment.
Figure 8:
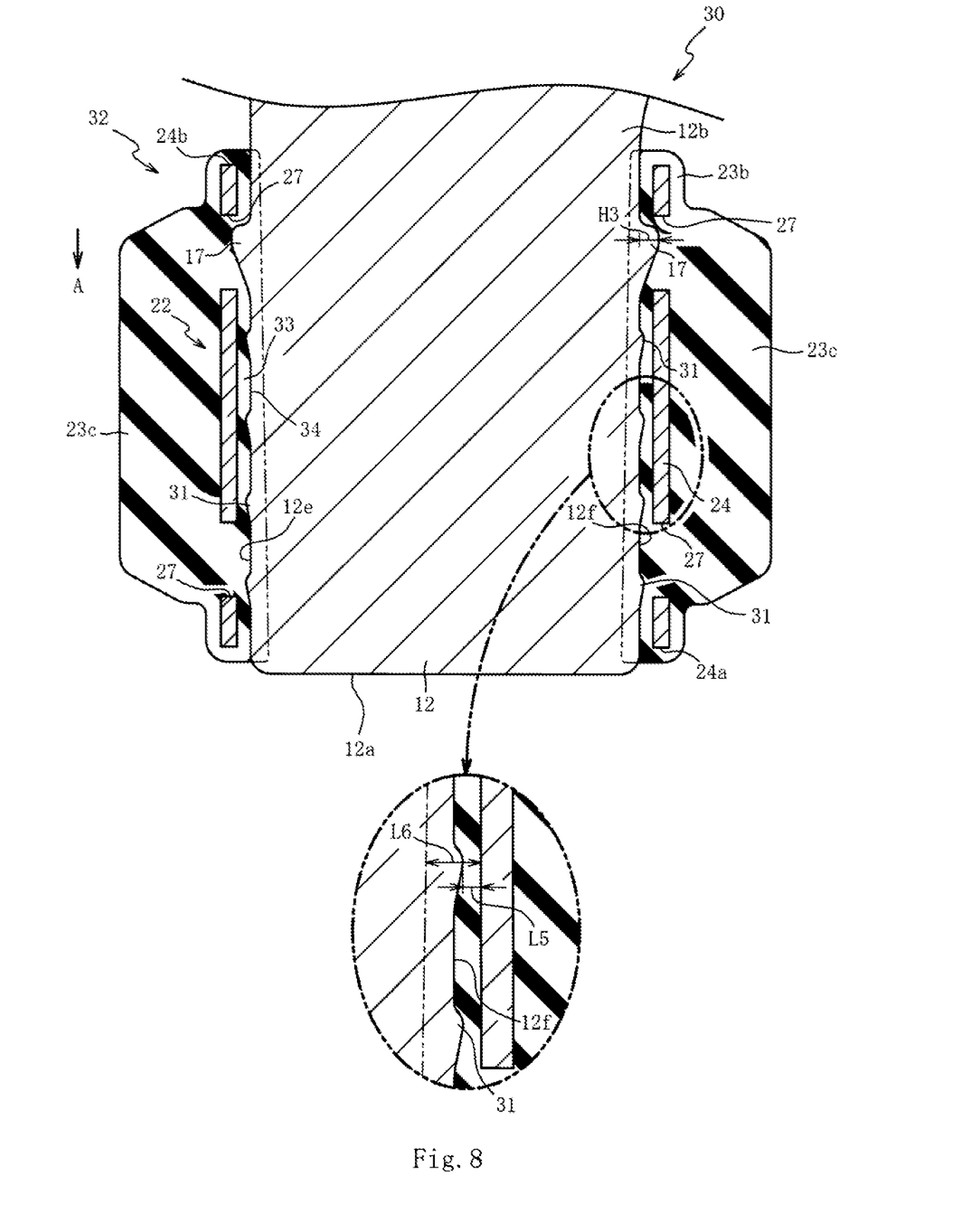
FIG. 8 is a cross-sectional view of the vibration isolator in a press fitting state.

Next, the following describes a second embodiment with reference to FIG. 7 and FIG. 8. The first embodiment has described the case where the inclination of the inner surface of the elastic film portion 23a (press-fitted portion 20) is comparatively small. In contrast to this, the second embodiment describes the case where an inclination of an inner surface 34 of an elastic film portion 33 (press-fitted portion 32) is comparatively large. The following gives identical reference numerals to parts identical to those of the first embodiment and omits their descriptions. FIG. 7 is a cross-sectional view of a vibration isolator 30 illustrating an early stage in press-fitting in the second embodiment. FIG. 7 and FIG. 8 are cross-sectional views of the vibration isolator 30 in the press fitting state. FIG. 8 illustrates the inner surfaces 34 of the elastic film portion 33 in the non-press fitting state by the two-dot chain line. For ease of understanding, FIG. 7 and FIG. 8 exaggeratedly illustrate a thickness of the elastic film portion 33 in the non-press fitting state and an inclination angle of the inner surface 34.

As illustrated in FIG. 7 and FIG. 8, a plurality of first protrusion portions 31 disposed on the press-fit portion 12 of the vibration isolator 30 are parts projecting in a direction perpendicular to the press fitting direction A. The plurality of first protrusion portions 31 are disposed at the outer surfaces 12c, 12d, 12e, 12f avoiding the groove portion 14 and the bulge portion 15. The plurality of first protrusion portions 31 are located separated from one another in the press fitting direction A. All of the plurality of first protrusion portions 31 are configured to have the identical height H1.

The respective first protrusion portions 31 have the wedge shape where the first protrusion portions 31 on the rear end 12b side are disposed upright approximately perpendicular from the outer surfaces 12e, 12f and the first protrusion portions 31 on the distal end 12a side are inclined. The first protrusion portions 31 are thick on the rear end 12b side and become gradually thin toward the distal end 12a side. Therefore, the press-fit portion 12 can be easily press-fitted to the tubular press-fitted portion 32. Additionally, in the press fitting state, the press-fit portion 12 can be less likely to come off from the press-fitted portion 32.

The filmy elastic film portion 33 as a part of the elastic portion 23 is vulcanization-bonded to the inner surfaces of the approximately square tubular-shaped rigid portion 22 in the press-fitted portion 32 of the vibration isolator 30. The elastic film portion 33 is a part sandwiched between the press-fit portion 12 and the rigid portion 22 in a state where the press-fit portion 12 is press-fitted to the press-fitted portion 32.

The inner surfaces 34 of the elastic film portion 33 (press-fitted portion 32) are configured to be made approximately flush across the overall length in the press fitting direction A. The inner surfaces 34 of the elastic film portion 33 are inclined such that between the opposed inner surfaces 34 becomes narrower as approaching from the open end portion 24b side toward the open end portion 24a side of the rigid portion 22. That is, the thickness of the elastic film portion 33 increases as approaching from the open end portion 24b side toward the open end portion 24a side. In view of this, when the press-fitted portion 32 is demolded from the mold after the vulcanization molding of the elastic film portion 33, the inclinations of the inner surfaces 34 function as a draft; therefore, the press-fitted portion 32 can be easily demolded from the mold. The inclination angle of the inner surface 34 with respect to the press fitting direction A (the inner surfaces of the first metal fitting 24) may be appropriately changed.

Press-fitting the press-fit portion 12 to the press-fitted portion 32 in the press fitting direction A makes the initial state in the press-fitting where the first protrusion portions 31 on the most distal end 12a side are press-fitted as illustrated in FIG. 7. In this initial state, the elastic film portion 33 having a thickness L4 in the non-press fitting state is compressively deformed, thus the elastic film portion 33 having a thickness L5 between the first protrusion portion 31 and the rigid portion 22.

Additionally press-fitting the press-fit portion 12 to the press-fitted portion 32 in the press fitting direction A press-fits all of the first protrusion portions 31 in the latter stage in the press-fitting and in the press fitting state illustrated in FIG. 8. At this time, while the elastic film portion 33 has the thickness L5 between the first protrusion portion 31 on the most distal end 12a side and the rigid portion 22, the elastic film portion 33 has a thickness L6 in the non-press fitting state at the position. Since the thickness of the elastic film portion 33 in the non-press fitting state increases from the open end portion 24b side toward the open end portion 24a side; therefore, the thickness L6 is larger than the thickness L4.

Therefore, a compression ratio $(L6-L5)/L6$ of the elastic film portion 33 between the first protrusion portion 31 on the most distal end 12a side and the rigid portion 22 in the press fitting state illustrated in FIG. 8 becomes larger than a compression ratio $(L4-L5)/L4$ of the elastic film portion 33 between the first protrusion portion 31 and the rigid portion 22 at the early stage in the press-fitting illustrated in FIG. 7. This allows decreasing the load in the press fitting direction A applied from the first protrusion portions 31 to the elastic film portion 33 at the early stage in the press-fitting; therefore, the shear stress generated between the part near the open end portion 24b of the rigid portion 22 and the elastic film portion 33 can be decreased.

Since the part near the open end portion 24b of the rigid portion 22 is likely to be a starting point where the elastic film portion 33 peels off from the rigid portion 22. Accordingly, by decreasing the shear stress at the position, the elastic film portion 33 can be less likely to peel off from the rigid portion 22. On the other hand, in the press fitting state, the compression ratio $(L6-L5)/L6$ of the elastic film portion 33 between the first protrusion portion 31 on the most distal end 12a side and the rigid portion 22 is large; therefore, the large elastic reaction force of the elastic film portion 33 at the part can cause the press-fit portion 12 to be less likely to come off from the press-fitted portion 32 further.

As described above, the present invention has been described based on the above-mentioned embodiments. It will be easily appreciated that the present invention will not be limited to the embodiments described above, but various modifications and improvements are possible without departing from the gist of the present invention. For example, the shapes and the dimensions of the respective portions of the bracket 2, the first attachment tool 3, the second attachment tool 4, and the vibration-isolation base 5 may be changed as necessary. The vibration isolators 1, 30 are not limited to the liquid sealing type vibration isolator, and the present invention is applicable to a vibration isolator where liquid is not sealed. The configuration is not limited to the case where the elastic portion 23 is vulcanization-bonded to the rigid portion 22 and the elastic portion 23 may be bonded to the rigid portion 22 by a bonding method other than the vulcanization bonding.

While the respective embodiments have described the case where the bracket 2 is mounted to the vibration source side and the second attachment tool 4 is mounted to the support body side, the configuration is not necessarily limited to this. The bracket 2 may be mounted to the support body side and the second attachment tool 4 may be mounted to the vibration source side.

While the above-described respective embodiments have described the case where the press-fit portion 12 is disposed at the bracket 2 and the press-fitted portions 20, 32 are disposed at the first attachment tool 3, the configuration is not necessarily limited to this. It is obviously possible that press-fitted portions 20, 32 are disposed at the bracket 2 and the press-fit portion 12 is disposed at the first attachment tool 3.

While the above-described respective embodiments have described the case where the bracket 2 is made of aluminum alloy and the rigid portion 22 is made of steel, the configuration is not necessarily limited to this. As long as the rigidity is higher than that of the elastic body, the bracket 2 may be made of, for example, metal other than an aluminum alloy and synthetic resin, and the rigid portion 22 may be made of, for example, metal other than steel and synthetic resin. The bracket 2 and the rigid portion 22 may be made of an identical material.

While the above-described respective embodiments have described the case where the recesses 27 are formed penetrating the rigid portion 22, the configuration is not necessarily limited to this. The recesses 27 only need to be parts where the inner surfaces of the rigid portion 22 are depressed with respect to both front and rear sides in the press fitting direction A and the recesses 27 may have bottoms. With the recesses 27 having the bottoms, the elastic film portions 23*a*, 33 compressively deform between the bottoms of the recesses 27 and the second protrusion portions 17 and the elastic film portions 23*a*, 33 are strongly pressed against the press-fit portion 12 by the elastic reaction force. Accordingly, as long as the elastic reaction force is not to the extent of deforming the rigid portion 22, the press-fit portion 12 can be less likely to come off from the press-fitted portion 20.

While the above-described respective embodiments have described the case where the second protrusion portions 17 are located on the rear end 12*b* side of the plurality of first protrusion portions 16, 31, the second protrusion portions 17 may be located between the plurality of first protrusion portions 16, 31, and the second protrusion portions 17 may be located on the distal end 12*a* side of the plurality of first protrusion portions 16, 31. In this case, the height H3 of the second protrusion portions 17 is preferably configured to be comparatively low so as not to elastically deform the rigid portion 22 due to the deformation of the rigid portion 22 with the second protrusion portions 17 in the press-fitting and break the welded part of the first metal fitting 24 with the second metal fitting 25.

While the above-described respective embodiments have described the case where the recesses 27 are covered with the elastic portion 23 (elastic film portions 23*a*, 33), the configuration is not necessarily limited to this. The elastic portion 23 needs not to be disposed at the parts of the recesses 27. In this case, the second protrusion portions 17 directly mesh with the peripheral edges of the recesses 27, the relative movement between the press-fitted portions 20, 32 and the press-fit portion 12 can be easily reduced, and the press-fit portion 12 can be less likely to come off from the press-fitted portions 20, 32. Note that the recesses 27 and the second protrusion portions 17 need to be accurately formed so as to decrease the gaps between the peripheral edges of the recesses 27 and the second protrusion portions 17 as much as possible. The large gaps between the peripheral edges of the recesses 27 and the second protrusion portions 17 cause the press-fitted portions 20, 32 and the press-fit portion 12 to be likely to relatively move and cause the press-fit portion 12 to be likely to come off from the press-fitted portions 20, 32. Therefore, the recesses 27 covered with the elastic portion 23 allow absorbing a manufacturing error or similar error of the recesses 27 and the second protrusion portions 17 with the elastic portion 23, the recesses 27 and the second protrusion portions 17 can be easily formed, and the press-fit portion 12 can be less likely to come off from the press-fitted portions 20, 32.

While the first embodiment has described that the outer surfaces 12*c*, 12*d*, 12*e*, 12*f* include the respective first protrusion portions 16 by four protrusions or five protrusions arranged in the press fitting direction A, the configuration is not limited to this. The respective outer surfaces 12*c*, 12*d*, 12*e*, 12*f* may include the first protrusion portion 16 by only one protrusion, and the number of first protrusion portions 16 located arranged in the press fitting direction A may be any number. While the embodiment has described the case where, among the plurality of first protrusion portions 16 arranged in the press fitting direction A, the distal end protrusion portions 16*a* are the two protrusions on the distal end 12*a* side, the rear end protrusion portions 16*b* are on the rear end 12*b* side with respect to the distal end protrusion portions 16*a*, and the height of the rear end protrusion portions 16*b* is larger than the height of the distal end protrusion portions 16*a*, the embodiment is not necessarily limited to this. It is possible to configure one protrusion or three or more protrusions on the distal end 12*a* side as the distal end protrusion portions 16*a*.

The plurality of first protrusion portions 16 may be configured so as to gradually increase from the distal end 12*a* toward the rear end 12*b*. In this case as well, the compression ratio of the elastic film portion 23*a* between a part of the first protrusion portions 16 (the most rear end 12*b* side) and the rigid portion 22 in the press fitting state can be larger than the compression ratio of the elastic film portion 23*a* between the first protrusion portion 16 and the rigid portion 22 at the early stage in the press-fitting. Accordingly, the elastic film portion 23*a* can be less likely to peel off from the rigid portion 22 and the press-fit portion 12 can be less likely to come off from the press-fitted portion 20 further.

The following illustrates other exemplary configurations as configurations to set the compression ratio of the elastic film portion 23*a* between at least a part of the first protrusion portions 16 and the rigid portion 22 in the press fitting state larger than the compression ratio of the elastic film portion 23*a* between the first protrusion portion 16 and the rigid portion 22 at the early stage in the press-fitting. For example, the configuration is to incline the inner surfaces 34 of the elastic film portion 33 (press-fitted portion 32) in the second embodiment. The configuration is not limited to the case of inclining the inner surfaces 34 such that the opposed interval between the inner surfaces 34 becomes narrow from the open end portion 24*b* side toward the open end portion 24*a* side, and the opposed interval between the inner surfaces 34 may be narrow in phases on the open end portion 24*a* side with respect to the open end portion 24*b* side.

At least one of the outer surfaces 12*c*, 12*d*, 12*e*, 12*f* and the rigid portion 22 may be inclined to one another or a step may be disposed such that the distance between the outer surfaces 12*c*, 12*d*, 12*e*, 12*f* of the press-fit portion 12 and the rigid portion 22 becomes short as approaching from the distal end 12*a* to the rear end 12*b*. Alternatively, a combination of these configurations may be employed.

When the distance between the opposed inner surfaces of the elastic film portion 23*a* are configured to be approximately constant and the thickness L1 of the elastic film portion 23*a* to be approximately constant across the overall length in the press fitting direction A in the non-press fitting state (When the inner surfaces of the rigid portion 22 and the elastic film portion 23*a* are formed to be made flush and approximately parallel to the press fitting direction A), the press-fit portion 12 can be easily press-fitted from both of the open end portion 24*a* side and the open end portion 24*b* side of the press-fitted portion 20 and also the increase in compression ratio of the elastic film portion 23*a* can be reduced at the early stage in the press-fitting when the press-fitting is performed from any of the open end portions 24*a*, 24*b*. To provide the steps at the inner surfaces of the rigid portion 22 and the elastic film portion 23*a* and form the inner surfaces of the rigid portion 22 and the elastic film portion 23*a* so as not to be parallel to the press fitting direction A, the opening of the press-fitted portion 20 on the side where a distance between the inner surfaces becomes narrow is preferably blocked so as to make the press-fitting of the press-fit portion 12 only from the direction where the distance between the inner surfaces is wide possible. This allows preventing the increase in compression ratio of the elastic film portion 23*a* at the early stage in the press-fitting caused by the press-fitting of the press-fit portion 12 from the side where the distance between the inner surfaces of the press-fitted portion 20 is narrow.

The invention claimed is:

1. A vibration isolator comprising:
a bracket and mounted to any one of a support body side and a vibration source side;
a first attachment tool mounted to the bracket;
a second attachment tool mounted to another one of the support body side and the vibration source side; and
a vibration-isolation base made of an elastic body, the vibration-isolation base coupling the first attachment tool and the second attachment tool together,
wherein any one of the bracket and the first attachment tool includes a press-fit portion, the press-fit portion has a rigidity higher than a rigidity of the elastic body, and the press-fit portion projects out in a press fitting direction from a rear end of the press-fit portion toward a distal end of the press-fit portion, and
another one of the bracket and the first attachment tool includes a tubular press-fitted portion, and the press-fit portion is press-fitted to the press-fitted portion in the press fitting direction,
wherein the press-fitted portion includes:
a tubular rigid portion having an inner surface with recesses depressed with respect to both front and rear sides in the press fitting direction, the rigid portion having at least one end with an open end portion, the rigid portion having a rigidity higher than a rigidity of the elastic body; and
an elastic film portion made of an elastic body bonded to an inner surface of the rigid portion,
wherein the press-fit portion includes:
a first protrusion portion projecting in a direction perpendicular to the press fitting direction, the first protrusion portion biting into the elastic film portion; and
a second protrusion portion that partially overlaps with the rigid portion as viewed in the press fitting direction with the second protrusion portion located inside the recess,
wherein the second protrusion portion is located on the rear end side with respect to the first protrusion portion,
wherein the rigid portion includes the respective open end portions on both front and rear ends in the press fitting direction such that the press-fit portion is configured to be press-fitted from both of the open end portions on both front and rear ends to the press-fitted portion, and
wherein the recesses are disposed on the respective open end portion sides on both front and rear ends such that the second protrusion portion is configured to be located inside the recesses.

2. The vibration isolator according to claim 1, wherein the elastic film portion covers the recesses, and the recesses are formed penetrating the rigid portion.

3. The vibration isolator according to claim 1, wherein the second protrusion portion has a wedge shape thick on the rear end side and gradually thinned toward the distal end side.

4. A vibration isolator comprising:
a bracket and mounted to any one of a support body side and a vibration source side;
a first attachment tool mounted to the bracket;
a second attachment tool mounted to another one of the support body side and the vibration source side; and
a vibration-isolation base made of an elastic body, the vibration-isolation base coupling the first attachment tool and the second attachment tool together,
wherein any one of the bracket and the first attachment tool includes a press-fit portion, the press-fit portion has a rigidity higher than a rigidity of the elastic body, and the press-fit portion projects out in a press fitting direction from a rear end of the press-fit portion toward a distal end of the press-fit portion, and
another one of the bracket and the first attachment tool includes a tubular press-fitted portion, and the press-fit portion is press-fitted to the press-fitted portion in the press fitting direction,
wherein the press-fitted portion includes:
a tubular rigid portion having an inner surface with recesses depressed with respect to both front and rear sides in the press fitting direction, the rigid portion having at least one end with an open end portion, the rigid portion having a rigidity higher than a rigidity of the elastic body; and
an elastic film portion made of an elastic body bonded to an inner surface of the rigid portion,
wherein the press-fit portion includes:
a first protrusion portion projecting in a direction perpendicular to the press fitting direction, the first protrusion portion biting into the elastic film portion; and
a second protrusion portion that partially overlaps with the rigid portion as viewed in the press fitting direction with the second protrusion portion located inside the recess, and
wherein a compression ratio of the elastic film portion between the first protrusion portion and the rigid portion in a compressed state where the press-fit portion has been press-fitted to the press-fitted portion is configured larger than a compression ratio of the elastic film portion between the first protrusion portion and the rigid portion at an early stage in the press-fitting where the press-fit portion is press-fitted to the press-fitted portion.

5. The vibration isolator according to claim 4, wherein a plurality of the first protrusion portions are located separated in the press fitting direction, the plurality of first protrusion portions being configured such that heights of the rear end side becomes larger than heights of the distal end side, and in the press-fitting that press-fits the press-fit portion to the press-fitted portion, an elastic reaction force applied from the elastic film portion to the first protrusion portion on the distal end side is configured smaller than an elastic reaction force applied from the elastic film portion to the first protrusion portion on the rear end side in a state where the first protrusion portion on the rear end side contacts the elastic film portion.

\* \* \* \* \*